United States Patent [19]

Balz

[11] Patent Number: 4,489,756

[45] Date of Patent: Dec. 25, 1984

[54] SLIDING GATE FLUID CONTROL VALVE

[75] Inventor: Jurgen Balz, Weinsberg, Fed. Rep. of Germany

[73] Assignee: Schubert & Salzer, Ingolstadt, Fed. Rep. of Germany

[21] Appl. No.: 509,985

[22] Filed: Jul. 5, 1983

Related U.S. Application Data

[63] Continuation of Ser. No. 283,331, Jul. 14, 1981.

[30] Foreign Application Priority Data

Jul. 26, 1980 [DE] Fed. Rep. of Germany . 3028435
Jul. 26, 1980 [DE] Fed. Rep. of Germany . 3028475
Jul. 26, 1980 [DE] Fed. Rep. of Germany . 3028485
Nov. 12, 1980 [DE] Fed. Rep. of Germany .. 3042568

[51] Int. Cl.³ .......................... F16K 3/30; F16K 51/00
[52] U.S. Cl. ............................... 137/625.33; 251/61.4; 251/61.5; 251/63.6; 251/285; 251/328; 251/368
[58] Field of Search ......................... 137/625.3, 625.33; 251/61.2, 61.4, 61.5, 62, 63.5, 63.6, 285, 326, 328, 368

[56] References Cited

U.S. PATENT DOCUMENTS

| 1,923,788 | 8/1933 | Mastenbrook | 251/61.4 |
|---|---|---|---|
| 2,493,966 | 1/1950 | Hartley | 251/285 |
| 2,584,847 | 2/1952 | Dahl | 251/285 |
| 2,601,231 | 6/1952 | Smith et al. | 137/625.33 |
| 2,615,468 | 10/1952 | Woolley | 251/61.4 |
| 2,640,498 | 6/1953 | Bissell | 251/282 |
| 2,697,581 | 12/1954 | Ray | 251/285 |
| 2,827,260 | 3/1958 | Jordan | 137/625.3 |
| 3,084,901 | 4/1963 | Thorburn | 251/61.4 |
| 3,159,177 | 12/1964 | Hott, Jr. | 251/368 X |
| 3,175,473 | 3/1965 | Boteler et al. | 251/285 |
| 3,183,926 | 5/1965 | Boudot | 251/193 X |
| 3,241,805 | 3/1966 | Schumann | 251/61.4 |
| 3,304,949 | 2/1967 | Baumann | 251/363 |
| 3,331,396 | 7/1967 | Willis | 251/368 |
| 3,380,474 | 4/1968 | Mills | 251/285 |
| 3,517,697 | 6/1930 | Hott, Jr. et al. | 137/625.33 |
| 3,955,591 | 5/1976 | Baumann | 137/625.3 |
| 4,211,387 | 7/1980 | Getchell et al. | 251/61.4 |

FOREIGN PATENT DOCUMENTS 0495248 1/1978 Australia .................. 137/625.3

Primary Examiner—Alan Cohan
Assistant Examiner—John A. Rivell
Attorney, Agent, or Firm—Dority & Manning

[57] ABSTRACT

A sliding gate valve includes a valve body (1) and a valve plate (5) which can slide transversely to the direction (108) of flow of the medium and exhibits narrow slot passages (50, 51) running transversely to the direction of the stroke, and which cooperates with a counterpart (4). The counterpart (4) is composed of a valve seat (40) which, like valve plate (5), consists completely of ceramic, and further includes a metallic supporting part (41) which supports the valve seat (40) across the whole area of the side of it opposite valve plate (5). The counterpart (4) includes passages which may be opened or closed by the valve plate (5) and are formed by slotted passages (400, 410; 401, 411; 402, 412) in alignment in the valve seat (4) and in supporting part (41). The valve plate (5) is connected via a screw connection (6, 61, 610; 8, 61, 615) to a driving unit which includes a part (33) acted upon by a control medium. This driving unit is, in turn, connected via a connecting part (2) to the valve body (1). Screw connection (6, 61, 610; 8, 61, 615) adjusts the distance between part (33) and valve plate (5) and allows precise alignment of the passages of the valve plate (5) and valve seat (40) which is critical owing to the brittleness of the ceramic material.

37 Claims, 7 Drawing Figures

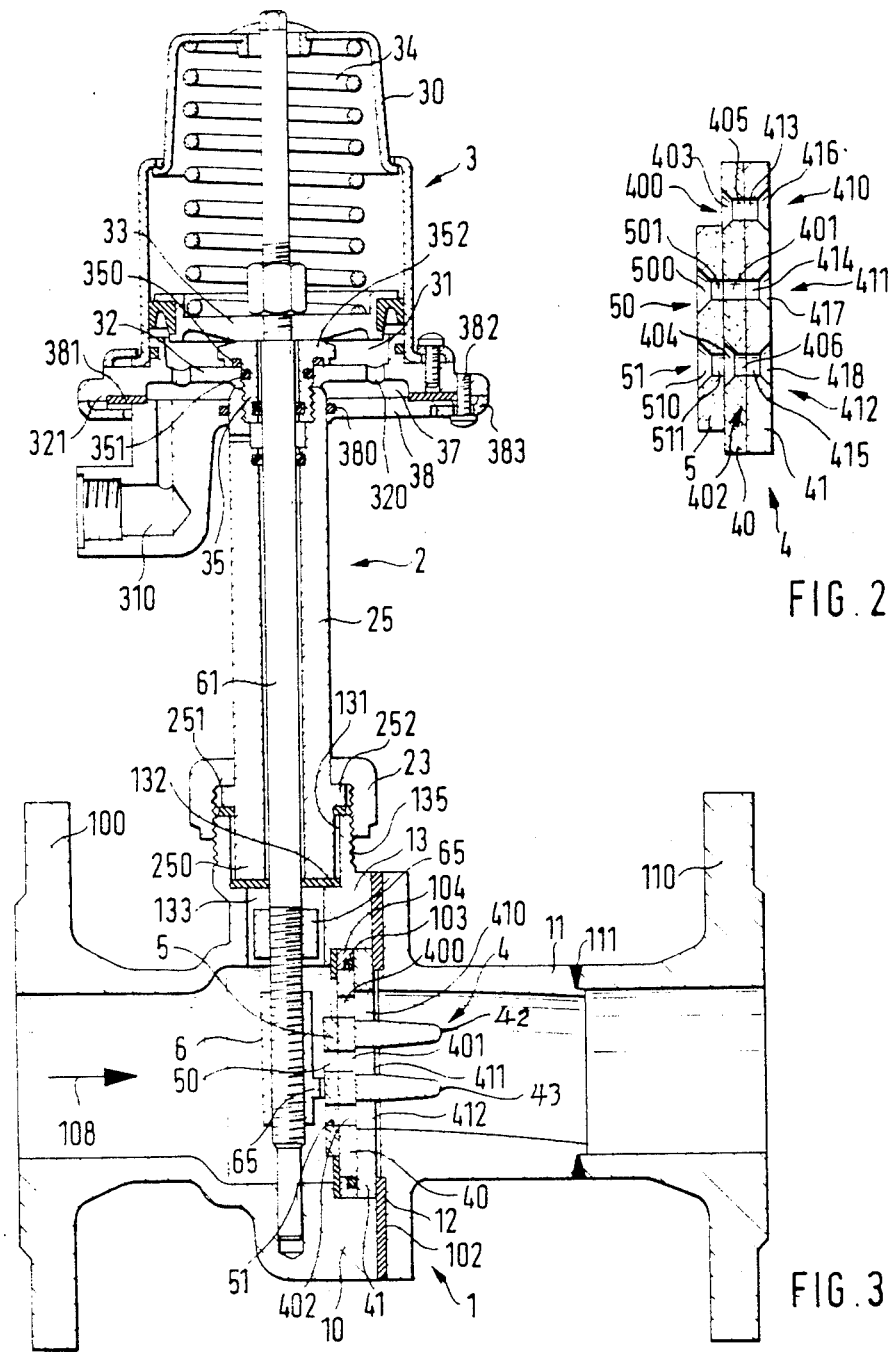

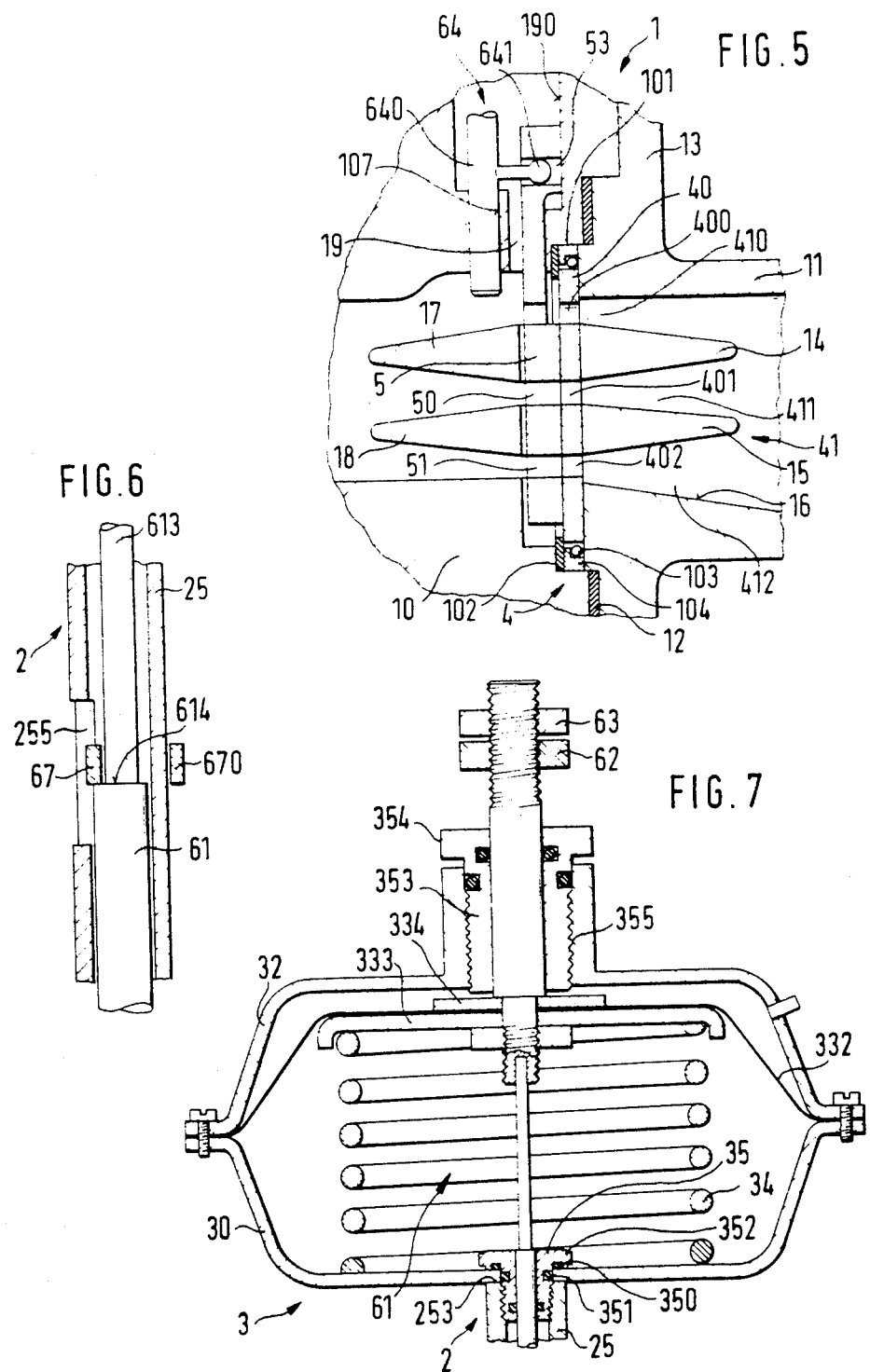

SLIDING GATE FLUID CONTROL VALVE

This application is a continuation of application Ser. No. 283,331, filed July 14, 1981.

BACKGROUND OF THE INVENTION

The present application refers to a slide valve of the type having a valve body and a valve plate which can slide transversely to the direction of flow of the medium and includes valve passages, and which cooperates with a counterpart which likewise includes passages which can be opened or closed by the valve plate.

The cooperating parts of the valve have as a rule been manufactured from metal (U.S. Pat. No. 3,159,177), yet metals are subject to relatively high wear.

In order to avoid this disadvantage it is known of making the cooperating faces more resistant by their obtaining a ceramic coating by plasma-coating (see the brochure "Jordan Valve—Sliding Gate Control Valves", page 4, right-hand column, section "Jordanic"). The plasma-coating is a difficult process which demands a plurality of working steps not only for the application of the coating but also for the finishing in order to impart to the passages which have been partially closed during the coating the precise size and shape.

The object of the present invention is to construct a slide valve of the kind mentioned initially, in such a way that the cooperating closure parts are resistent to wear and are nevertheless simple and favorable in cost to produce.

SUMMARY OF THE INVENTION

This is accomplished in accordance with the invention in the way that the counterpart is composed of a valve seat which, like the slidable valve plate, consists completely of ceramic, and a metallic supporting part which supports the valve seat across the whole area of the side of it remote from the valve plate, the passages in the counterpart are formed by passages in alignment in the valve seat and in the supporting part. Since the counterpart consists of two parts, the part forming the valve seat may be constructed solely for its valving function and capacity for resistance necessary for this purpose, while the part made as the supporting part is not frictionally loaded and only has to be tailored to the problem of absorbing the compressive forces acting upon the valve seat through the medium. This division of the counterpart into two parts enables simple and economical production while at the same time high capacity for resistance to friction is achieved with the cooperating valving parts which, however, are not coated with a ceramic material but consist entirely of ceramic.

The supporting part may be made replaceable or else as an integral component of the valve body If the supporting part can be exchanged, it is possible through simple exchange of the valving closure parts to convert the slide valve to other nominal cross-sections, which may be of significance in the case of application as a regulator valve. If the supporting part is on the contrary made as an integral component of the valve body fewer parts are needed, whereby the slide valve is less complicated.

Because the medium flowing through the slide valve does not get deflected, such a valve works particularly silently. A further improvement is achieved if the supporting part is made favorable to flow. This can be achieved in a simple way by an appropriate shape of the cross-section of the passages. In an advantageous and optimum way additional damping of noise is achieved if the supporting part includes ribs which run parallel with the passages and taper in the direction of flow of the medium. The noise-damping action of the supporting part may be assisted by the valve plate or the valve body being made favorable to flow on the side next the medium inlet, in which case the drive connection for the valve plate is advantageously effected outside the flow of the medium which is to be controlled.

Through the separation of the valve seat and supporting part it is also possible to make the counterpart which cooperates with the valve plate, more favorable to flow without the risk arising of failures in the coating because of a complicated shape of the body to be coated.

Since the valve seat is not adjustable with respect to the supporting part, for equalization of tolerances in order to avoid turbulence, the dimensions of the passages in the valve seat are advantageously smaller than in the supporting part.

In order to load the valve seat as little as possible, since it consists of ceramic and is brittle, the valve seat resting against the supporting part is fixed elastically both at the side of it remote from the supporting part and also in radial directions by means of seals. Hence the valve seat is supported to float.

Heat-shock may arise in slide valves, which is problematical since ceramic materials are poor conductors of heat. In the case of the valve plate surrounded by medium on the side adjacent the medium inlet and at the side faces, heat-shock does not as a rule occur. However, in the case of the valve seat which is opened and closed and can advantageously consist of a ceramic material and is not directly confronted with heat-shock.

Slide valves in accordance with the present invention includes valving parts consisting of ceramic and hence of a brittle material which must not serve as a stop in order to avoid stresses in these parts. It is therefore necessary to precisely set the movement of the valve plate stroke. For safe operation this is necessary in order to avoid damage to the valve plate consisting of brittle material. For adjustment of the valve plate with respect to the stationary counterpart the practice is known of arranging on the positioning-rod a carrier which can be adjusted axially and fixed by one or more positioning-nuts (U.S. Pat. Nos. 3,517,697 and 3,159,177). The setting of the valve plate with respect to the stationary counterpart is in this case extremely difficult. First of all the carrier is set coarsely with a counterpart which has not yet been inserted and a valve plate which has not yet been inserted. Then after insertion of the counterpart and the valve plate, and mounting of the driving unit, the alignment of the passages in the valve plate and in the counterpart is checked. The setting process is repeated a number of times until these passages match. However, normally the valve plate and the counterpart must be removed and inserted a number of times. The setting cannot be checked until after the setting has been performed. Even if special tools are applied in order to perform this setting from the side of the valve body through which the carrier extends, this checking by special tools is not possible at the same time as the setting or is at least made considerably more difficult. In the case of the ceramic parts proposed in accordance with the invention there exists an increased risk of damage occurring during repeated insertion and removal.

In further refinement of the object of the invention the driving unit can be rotated with respect to the valve body and can be fixed in any position of rotation. The part of the driving unit acted upon by the control medium and the valve plate are connected together by a screw connection which can be adjusted to alter the distance apart. A part of the screw connection connected to the drive unit and a part of the screw connection connected to the valve plate are guided fixedly in rotation by the valve body. Thus, by rotating the driving unit with respect to the valve body the valve plate can be linearly moved and adjusted. Afterwards, the driving unit can be fixed in any position of rotation with respect to the valve body. Checking of the setting of the valve plate can be effected at the same time as the setting, depending upon the kind of valve, due to the fact that during the work of setting no tool of any kind impedes the view into and through the valve body. Such a possibility of setting is advantageous even in the case of other valves in which a restriction of the valve travel must not be effected by the valve closure part itself.

The screw connection between the parts of the driving unit and in the valve body may be made in various ways and lie also at various points between these parts. In accordance with a preferred embodiment of the invention the screw connection lies between a positioning-rod connected to the drive unit and the valve plate, the positioning rod und the valve plate being fixed against rotation. Preferably in that case a positioning-member is made as a positioning-sleeve screwed onto the positioning-rod.

The carrier which adjusts the valve plate is advantageously a prong carried by the positioning-sleeve since by this means a simple construction of the object of the invention is achieved.

In the case of adjustment of the valve plate by rotating the positioning-rod, the positioning-sleeve must be prevented from this turning movement. For doing this it is possible to equip the positioning-sleeve with a dog or longitudinal groove with which a corresponding counterpiece on the body cooperates. Otherwise, the valve plate would need a guide at the side and in working, the valve plate would be subjected to increased friction. Therefore in accordance with a further feature of the invention the carrier is made fork-shaped and forms at the same time the device for securing the positioning-sleeve against rotation. If for the adjustment of the valve plate the positioning-rod is now turned, one carrier prong which engages in a corresponding recess in the valve plate, is laid against the counterpart and hence is prevented from further turning.

In order to keep the forces small which are acting on the ceramic valve plate and in order to enable optimum utilization of the area of the valve plate, it is advantageous that the valve plate includes two recesses at its outer circumference in the central plane lying diametrically opposite one another for receiving the two carrier prongs. Such a construction of the carrier is an advantage even in the case of other known slide valves. Since the recesses for receiving the carrier prongs lie at the outer circumference of the valve plate, its whole area is available for the application of passages. Though maintaining the cross sectional area of the passages the total area of the valve plate can be made smaller than in the case of known slide valves of this type. By this means the slide valve may be altogether smaller than the conventional slide valves of this kind. Since because of adhesion the valve plate sticks fast against the counterplate, the area exposed to the force of adhesion is also reduced.

Although in principle it is possible to provide one passage in the aforesaid central plane of the valve plate, yet it has proved particularly advantageous to make the valve plate in such a way that it exhibits an even number of passages which are arranged symmetrically about the central plane. This guarantees that the medium does not have to be deflected between the part connecting the two carrier prongs and the passages in the valve plate, so that the slide valve is very silent.

The positioning sleeve may be made in various ways, for example, in the form of a sleeve through which the positioning-rod projects completely. In this case the guidance of the carrier is effected by the positioning-rod alone, for the production of which, therefore, special requirements as to accuracy have to be imposed. Therefore, the positioning-sleeve advantageously includes a blind bore in which the positioning-rod ends, and the positioning-sleeve extends right into a guide hole drilled in the valve body. By guiding the positioning-sleeve by the carrier the positioning-rod can be kept shorter and exact alignment is not of great importance. By guiding the positioning-sleeve by the valve body, the positioning-rod serves only for the adjustment. Valving movements transmitted to the valve plate are therefore more exact, so that both more exact adjustment and also a more exact regulation (in the use of the slide valve as a regulator valve) and also more secure opening and closing (in the use of the slide valve as a shut-off valve) are achieved.

In accordance with a preferred embodiment of the invention, the connecting part is made as a sleeve which contains the positioning-rod and the cylindrical end of which is supported rotatably in a hole drilled in the body. The recess therefore holds the sleeve securely even when it is not yet secured in its final position by fixing and adjustment of the valve plate is possible in a particularly simple way.

Securing of the connecting part may be effected in various ways. For example, by the valve body including tapped holes for receiving screws which are passed through arcuate slots in the connecting part which enable turning of the connecting part, and are screwed into the body. The arcuate slots may also be provided in the valve body and the tapped holes in the connecting part. Also both the connecting part(s) and the valve body may include arcuate slots for receiving screws, in which case nuts are mounted on the ends of the screws. If the connecting part is made as a sleeve, it preferably includes an annular shoulder with which is associated a clamping part which can be connected to the valve body.

By turning the driving unit with respect to the valve body the driving unit adopts a position of rotation which leaves the inlet opening to chance. This is undesirable for optical reasons and because of the connection to the control pipe for the control medium. In practice, a general definite alignment of the connection of the driving unit is demanded. For this purpose, the driving unit is fastened rotatably to the connecting part whereby alignment after the inlet is afforded.

In order to avoid turning of the positioning-rod in seals in the valve body or in the connecting part, which is possible only by the exertion of large forces, there is advantageously associated with the driving unit, a carrier plate which carries a drive housing. After loosening of a fixing device the drive housing can be rotated with respect to the carrier plate. The drive housing contains a part which can be acted upon by the control medium, e.g., an electromagnet or a piston which is loaded hydraulically or pneumatically. Advantageously the part which can be acted upon by the control medium is a piston which bounds a pressure chamber which is connected via at least one opening to a chamber which is provided between the drive housing and the carrier plate and which includes an inlet opening for the control medium.

The carrier plate which may be both identical with a bottom of the cylinder or a part separated herefrom is advantageously carried by the connecting part so as to be rotatable but axially fixed. This is preferably provided by the connecting part carrying a stop which at an end adjacent the driving unit includes a flangelike widening. Between this widening and the end of the connecting part, the bottom of the driving unit is clamped elastically by means of seals.

The screw connection between the driven parts in the driving unit and in the valve body may be made in different ways. In accordance with a preferred execution the part of the screw connection guided fixedly in rotation in the driving unit is made as a carrier of the part which can be acted upon by the control medium, and is screwed onto the positioning-rod. Hence the setting of the valve plate is effected between the driving unit and the connecting part so that the connection between the valve body and the connecting part does not need to be loosened. If such a carrier is applied in combination with a carrier plate separate from the bottom of the cylinder of the driving unit, it is advantageous if the wall of the drive housing next the carrier plate is used as the rotationally fixed guide of the driving unit for the carrier.

If after adjustment of the positioning-sleeve, the driving unit and hence the valve plate become rotated on the connecting part, further rotating of the positioning-rod must be prevented since such would bring about an alteration of the adjustment which has been performed. This may be effected by the seals which seal the positioning-rod with respect to the sleeve. The seals exert upon the positioning-rod a friction which is so high that the latter is already prevented from following the movement of rotation of the driving unit. The sleeve through its connection to the valve body is securely held fixed in rotation. It may be advantageous in addition to associate with the positioning-rod a device which fixes its position of rotation relative to the connecting part. For doing this the connecting part advantageously exhibits an internal polygonal guide in which the positioning-rod is guided by means of an external polygonal guide.

In order that the travel of the valve plate may be limited not only in the one direction of the stroke by contact of the piston against a stop, but also in the opposite direction, a stop is associated with the positioning-rod, which limits the stroke brought about by the control medium.

When the sleeve and the positioning-rod include cooperating polygonal profiles, the stop has a recess for receiving the external polygonal guide of the positioning-rod so as to abtain a more compact construction.

In order to be able to adjust the stop without dismantling the device, the positioning-rod includes a fixed stop and the counter-stop is arranged to be adjustable and accessible from outside the part containing it. In accordance with another embodiment of the invention the stop is arranged to be adjustable on the positioning-rod outside the driving unit and cooperates with the driving unit as the counter-unit. In order to achieve a particularly compact construction, a threaded bush is preferably provided in the housing of the driving unit on the side next the inlet for the control medium. One side serves as a stop for the part which is acted upon by the control medium, and the other side serves as the counterstop for the stop arranged on the positioning-rod. The threaded bush is screwed into the housing of the driving unit and includes the same pitch as the screw connection between the driving unit and the closure part, in order not to alter the travel distance of the valve plate at the time of the setting.

The object of the invention in a simple way solves a problem which is inherent in slide valves. Here high resistance to wear, high safety in operation and simple adjustability which is based especially upon the particular importance of valves of that kind, are provided all at once. Extremely small travels are provided for, which considerably increase the working life of the sealing parts which are frictionally loaded by the movement. Accurate guidance and setting of the cooperating valve parts in order to achieve satisfactory operation is provided.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is a partial section illustrating a construction for valve parts according to the invention, FIG. 3 is a longitudinal section of an alternate embodiment of a slide valve according to the invention having a driving unit which can be rotated relative to the body of the slide valve, FIG. 5 illustrates a further modification of the device in accordance with the invention in which a supporting part is an integral component of the valve body and is made favorable to flow, FIG. 6 is a partial view illustrating a connecting part between the driving unit and the valve for limiting the stroke of the valve plate in accordance with the invention, and FIG. 7 illustrates another embodiment of the invention having the direction of action of the driving unit reversed with respect to FIGS. 1, 3 and 4.

DESCRIPTION OF A PREFERRED EMBODIMENT

Figure 1:
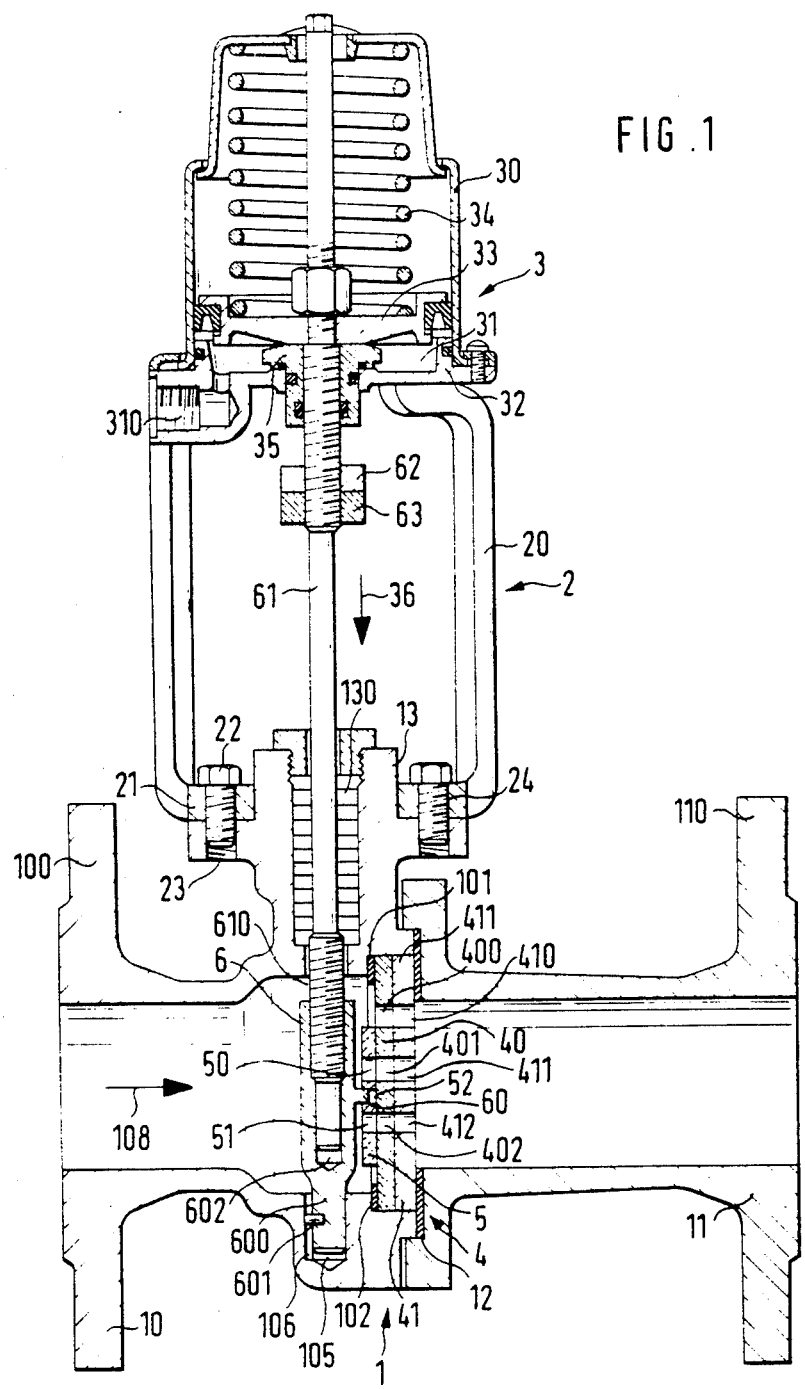
FIG. 1 is a longitudinal section of a slide valve made in accordance with the invention which includes a driving unit.

A slide valve includes a valve body 1 which is connected via a connecting part 2 to a driving or actuating unit 3. The valve body 1 consists of two parts 10 and 11 which are connected together in a conventional way which is therefore not shown, the point of separation is secured by means of a seal 12 against escape of the medium which is to be controlled. Each part 10 and 11 of the body 1 carries a flange 100 and 110 respectively, to which it is connected in one piece or by means of a seam weld 111 (FIG. 3) and which serves for connection to other fittings or another pipe (not shown).

The part 10 includes a recess 101 for receiving a stationary counterpart designated generally as 4 with which cooperates a valve plate 5 which can slide transversely to the direction of flow of the medium. The valve plate 5 consists of ceramic material and bears against the counterpart 4. The counterpart 4 consists of a first plate which forms the valve seat 40 and likewise consists of ceramic material and against which the valve plate 5 rests to make a seal, as well as of a second plate which consists of metal and serves as the supporting part 41 for the valve seat 40 which bears over its whole area against the supporting part 41.

For the elastic support of the parts forming the counterpart 4 (the valve seat 40 and the supporting part 41) and for sealing the part 10 with respect to part 11 between the parts 10 and 11 in the recess 101 at the side next the valve plate 5, a seal 102 is provided against which the valve seat 40 rests, while the supporting part 41 rests against the seal 12.

The counterpart exhibits passages which run transversely to the direction of the stroke of the valve plate 5 and are formed by passages 400 and 410, 401 and 411 as well as 402 and 412 in alignment with one another in the valve seat 40 and in the supporting part 41, while the valve plate 5 resting against the valve seat 40 exhibits passages 50 and 51. In the position of the valve plate 5 as shown the top edge of the valve plate 5 exposes the passages 400 and 410, the passage 50 exposes the passages 401 and 411 and the passage 51 exposes the passages 402 and 412 so that the medium can flow through the body 1.

The valve plate 5 includes a drive opening 52 in which engages a carrier 60 connected to a positioning-sleeve 6 which is axially adjustable. The positioning-sleeve 6 is arranged by means of a bore 602 and a thread 610 on the end of a positioning-rod 61, while a remote end 600 is guided in a hole 105 drilled in the part 10 of the valve body 1.

Means for securing positioning-sleeve 6 against rotation consists of a longitudinal groove 106 provided in a surface of the drilled hole 105 and a guide pin 601 which engages in the groove and is carried by the end 600 of the positioning-sleeve 6.

The part 10 includes an extension 13 by which positioning-rod 61 is guided, the valve body 1 being sealed by seals 130. The positioning-rod 61 is connected to driving unit 3 which consists of a cylinder 30 provided with a pressure chamber 31 which is connected via an opening 310 to a control pipe which is not shown. The pressure chamber 31 is bounded next adjacent the body 1 by a bottom 32 of cylinder 30 and an opposing side by a piston 33 which is connected to the positioning-rod 61. The piston 33 is acted upon by a return spring 34 which bears against the end of the cylinder 30 remote from the cylinder bottom 32. In the cylinder bottom 32 an adjustable stop 35 is provided for limitation of the travel of the piston 33 and limits the travel of the piston and thereby also of the valve plate 5 in the direction of the arrow 36.

Two locknuts 62 and 63 are arranged on the positioning-rod 61 between the stop 35, in which the positioning-rod 61 is supported to be able to slide, and the valve body 1. The locknuts cooperate with the stop 35 to set the maximum stroke of the piston 33 and hence of the valve plate 5.

The connecting part 2 consists of a plurality of struts 20 which may also be combined in the form of a cage into one component. These struts 20 are connected to the driving unit in any suitable manner. The struts 20 include segmental sections 21, which in the construction of the connecting part 2 as a cage are combined into a ring which exhibit elongated holes 24. Holes 24 receive screws 22 which may be screwed into corresponding tapped holes 23 in the extension 13.

The device of the construction described above works as follows:

The medium which is to be controlled flows in the direction of the arrow 108 through the body 1 when the valve plate 5 is in the position shown. In this position of the valve plate 5 the driving unit 3 is not being acted upon by control medium, so that the return spring 34 has brought the piston 33 into contact with the stop 35.

The medium which is to be controlled exerts upon the valve plate 5 and upon the valve seat 40 a pressure which under certain circumstances can adopt considerable values. Through this pressure the counterpart 4 becomes heavily loaded in bending. But the valve seat 40 cooperating with the valve plate 5 consists, just like the valve plate 5, of a ceramic material. But materials of that kind can stand only extremely low tensile and bending loadings, though they are capable of resisting even high pressures. Since there is associated with the valve seat 40 a supporting part 41 which consists of metal, this can absorb the stresses which arise. The valve seat 40 rests against the supporting part 41 so that the passages 400 and 410, 401 and 411 and 402 and 412 are respectively in alignment in pairs. Through this resting of the valve seat 40 against the supporting part 41 the valve seat 40 is not subjected to any tensile and bending stress, but merely to a compressive stress.

Hence, through the supporting part 41 associated with it, the valve seat 40 may consist completely of ceramic and thereby be produced in a simple and economical way. Since the valve plate 5 likewise bears via the valve seat 40 against the supporting part 41, that applies to the valve plate 5 too. The desired characteristics of the closure parts are now achieved in the case of a production which is simpler and more economical with respect to the production hitherto.

In the open position of the slide valve, in which the piston 33 is resting against the stop 35, the valve plate 5 adopts its bottom end position in which the passages 50 and 51 are in alignment with the passages 401, 411 and 402, 412 in the counterpart 4 and in which the top edge of the valve plate 5 reaches exactly up to the slit 400, 410 but leaves this completely open (FIG. 1).

When the slide valve is to be closed, a control medium is fed to the pressure chamber 31, whereby the piston 33 is displaced against the action of the return spring 34 until the locknut 62 comes into contact with the stop 35. In this position the valve plate 5 covers over by its solid areas the passages 400, 410, 401, 411 and 402, 412 of the counterpart 4. The slide valve is then closed.

If a regulator member is provided in the control pipe connected to the opening 310, the valve plate 5 can naturally adopt corresponding intermediate positions too. Th slide valve may then be applied both as a shutoff valve and also as a regulator valve.

The valve plate 5 and also the valve seat 40 must not be exposed to any tensions, since these ceramic parts are brittle and exhibit no great strength against tensions. Therefore, an exact limitation of the stroke and setting of the valve plate 5 relative to the counterpart 4 is an essential prerequisite in order to achieve exact and safe operation of the slide valve. This setting proceeds in the following manner.

The connecting part 2 with the driving unit 3 mounted on it is inserted onto the extension 13 of the valve body 1 and in doing so the positioning rod 61 is screwed a convenient distance into the positioning-sleeve 6. After insertion of the two-piece counterpart 4 and the valve plate 5 the dog 60 on the positioning sleeve 6 is brought into engagement with the drive opening 52 in the valve plate 5, whereupon the two parts 10 and 11 of the valve body 1 are connected together. During the screwing of the positioning-rod 61 into the positioning-sleeve 6 the latter is prevented from turning by the guide pin 601 guided in the longitudinal groove 106. During the screwing of the positioning-rod 61 into the positioning-sleeve 6 the progress of the setting may be observed, by the operator looking in the longitudinal direction through the valve body 1 and observing the relative position of the passages 50 and 401, 411 and respectively 51 and 402, 412. Hence, intervention inside the body is not necessary. Nevertheless exact adjustment is possible, this being without the assistance of costly special tools.

After reaching the desired position which corresponds with the open position of the slide valve as described above, the connecting part 2 may be fastened by means of its elongated holes 24 in any required position of rotation. This may be guaranteed especially by twice as many tapped holes 23 as elongated holes 24 being provided. By this means the connecting part 2 which can be twisted with respect to the body 1 may be fixed in any required position of rotation, by the screws 22 being introduced into an elongated hole 24 and screwed into a tapped hole. Hence, the setting and adjustment of the valve plate 5 is completed.

FIG. 2 shows a valve plate 5 as well as a counterpart 4 which are made favorable to flow. For this purpose the passages 50 and 51 in the valve plate 5 are made in such a way that they include a tapering narrowing section 500 and 510, respectively, in the direction of flow, with which is connected a section 501 and 511, respectively, of constant cross-section. In the same way the passages 400 and 402 which may be completely opened by the valve plate 5 have a first tapering section 403 and 404, respectively, and a second section 405 and 406, respectively, having a constant cross-section. The passages 410, 411 and 412 in the supporting part 41 include respectively a section 413, 414 and 415 in the direction of flow of constant cross-section, with which is connected in each case a tapering widening section 416, 417 and 418, respectively. In this way, the sudden transition from the cross-section of the interior of the part 10 of body 1 to the cross-section of the passages 400, 410, 50, 401, 411 and 51, 402, 412 is decreased, so that the medium flowing through the body 1 creates less turbulence and therefore is quieter with respect to the embodiment of FIG. 1.

Further silencing may be achieved if ribs 42 and 43 are molded onto the supporting part 41, which run generally parallel with the passages 410, 411 and 412 and taper in the direction of flow of the medium as given by the arrow 108, since in this way further calming of the medium flowing through is achieved (FIG. 3).

In accordance with FIGS. 1 to 3, the supporting part 41 is supported in the body 1 to be replaceable, whereby great flexibility as regards possibilities of application is achieved.

It often is not at all necessary to change the nominal cross-section of the counterpart 4, so that the possibility of exchanging the supporting part 41 may be waived. Such a construction is shown in FIG. 5. The valve seat 40 is in this case made in accordance with FIG. 1 or FIG. 2. The supporting part 41 is in the case of this construction an integral component of the part 11 of the valve body 1 and includes ribs 14 and 15. But if required the ribs 14 and 15 may also be carried by an insert (not shown) which may be inserted in the valve body 1. The part 11 also tapers in against the direction of flow of the medium until the inner wall 16 stands up as far as the passage 412 in the supporting part 41.

The embodiments of the supporting part 41 described as an example show that the supporting part may be made in various ways favorable to flow.

In the case of slide valves which work by means of a valve plate which can slide over a counterpart 4, in order to achieve a reversal of the direction of action, the idea is known of inserting the counterpart 4 turned by 180° in the body 1. In this way (with reference to FIG. 1) when the driving unit is unloaded the passages 400, 410, 401, 411 and 402, 412 of the counterpart 4 are covered over by the valve plate while the plate valve 5 acted upon by the driving unit 3 and the control medium opens the passage 402, 412 completely and by means of the passages 51 and 50 also opens the passages 401, 411 and 400, 410. If the part 11 is made symmetrical as regards its faces which serve for the fastening to the part 10, for the reversal of the direction of action of the driving unit 3, the part 11 having the ribs 14 and 15 may be turned by 180° with respect to the part 10 and then connected to the part 10 again.

Setting of the travel and the starting position of the valve plate 5 is effected in a similar way to that previously described, but with the difference that here during the setting the piston 33 must be acted upon by the control medium so that in the other end position the passage 50 exposes the passage 401, 411, the passage 51 exposes the passage 402, 412 and the bottom edge of the valve plate exposes the passage 400, 410.

As FIGS. 2, 3 and 5 show, it is possible, depending upon the application, to construct none, one or both of the closure parts (valve plate 5 and counterpart 4) favorable to flow.

As shown in FIG. 5, the valve body 1 may also be made favorable to flow at the medium inlet side, i.e., in the region of its part 10, by part 10 carrying ribs 17 and 18 which lie in the region between the passages 400, 401 and 402 of the valve seat 40 and which extend in parallel with the passages 50 and 51.

The connection between the positioning-rod 61 and the valve plate 5 may be effected in the way shown in FIG. 1, in which the ribs 17 and 18 have recesses (not shown) in which the positioning-sleeve 6 is guided. But it is also possible to extend the valve plate 5 in the direction towards the positioning-rod 61 and to connect the valve plate 5 outside the path of the medium to a positioning-sleeve 64 of which merely the end made as a pin 640 can be seen in FIG. 5.

The interior of the part 10 of the valve body 1 through which the medium flows, is essentially closed with respect to the extension 13 except for a guide bore 107 for the pin 640 of the positioning-sleeve 64 and an opening 19 through which the valve plate 5 projects through into the extension 13. In this region the valve plate 5 exhibits centrally a drive opening 53 or diametrically two drive openings with which the dog 641 on the positioning-sleeve 64 cooperates. A guide-face 190 for the valve plate 5 may be provided in the region of the extension 13.

In order to protect the supporting part 41 against wear, in accordance with FIG. 3 the passages 410, 411 and 412 in the supporting part 41 are larger than the passages 400, 401, and 402 in the valve seat 40. In this way manufacturing tolerances are compensated for too, which is important if the valve seat 40 is not adjustable with respect to the supporting part 41.

In order to keep the loading on the valve seat 40 consisting of ceramic material as low as possible, in accordance with FIGS. 3 and 5, the valve seat 40 is not simply clamped between two seals 102 and 12 which secure the valve seat 40 axially, but is secured elastically also in the radial direction. Since the valve plate 5 and the valve seat 40 consist of ceramic materials and materials of that kind because of adhesion (strengthened by the pressure of the medium which is to be controlled) stick very fast against one another the risk exists that in the case of adjustment of the valve plate 5 it takes the valve seat 40 along with it. For absorbing this movement a seal 103 surrounding the valve seat 40 radially is provided, which is supported in a retaining ring 104. The retaining ring 104, in turn, is clamped radially together with the supporting part 41 between the seals 102 and 12. Hence the seals 103 and 102 serve for securing the valve seat 40 axially and radially, so that the valve seat 40 is supported to float, i.e., elastically. If the valve seat 40 is shifted radially slightly with respect to the supporting part 41, the construction of the passages 400, 410, 401, 411 and 402, 412 as described brings about compensation.

By "passages" are to be understood in the sense of the invention any kind of apertures in the closure parts, which are provided for the medium to flow through. In order to need as small a stroke as possible, these apertures are as a rule kept narrow in the direction of the stroke in relation to their width and thus are in the form of narrow slots or slits.

Since the danger of heat-shock may arise, the valve seat 40 which only exposes small areas to the medium which is to be controlled in comparison with the valve plate 5, is produced from a ceramic material which is particularly resistant to heat-shock. The valve plate 5 may be constructed from ceramic materials which are normally sensitive to temperature.

The object of the invention may be modified in many ways. Thus, the driving unit 3 may be made in any suitable way in which the loading of the positioning-rod 61 against the action of the return spring 34 or any other elastic accumulator may be effected directly or indirectly, e.g., via a toggle transmission, or pneumatically, hydraulically or even electromagnetically.

The connecting part 2 may also be made in different ways. In accordance with FIG. 3 there is provided as the connecting part a sleeve 25 which contains the positioning-rod 61 and which carries the driving unit 3. Extension 13 includes a bore 131 for receiving the sleeve 25 having a shoulder 132, and a smaller bore 133 which is connected to the interior of part 10 of valve body 1. A nut 65 is contained in bore 133 which by suitable means, e.g., a grubscrew, is secured to the positioing-rod 61. The bore 131 receives the cylindrical end 250 of the sleeve 25 and has a diameter such that the sleeve 25 is on the one hand securely guided by the bore 131, but on the other hand can easily be turned in it, so that by turning the sleeve 25 the valve plate 5 may be brought axially into the required position, as the positioning-sleeve 6 does not rotate.

The nut 65 cooperates with end face 250 of sleeve 25 to limit the stroke of valve plate 5 (instead of the locknuts 62 and 63 in accordance with FIG. 1).

Extension 13 of part 10 includes an outer thread 135 onto which may be screwed a capnut 23 for fixing the sleeve 25, which can be turned in the valve body 1, after the conclusion of the work of adjustment. The capnut 23 overlaps a ring land 252 on the sleeve 25 and hence forces it against the shoulder 132 on the extension 13. Suitable means may be provided to reduce the friction between the capnut 23 and the sleeve 25 so that upon tightening the capnut 23 the sleeve 25 with the positioning-rod 61 does not get rotated and the adjustment of the valve plate 5 thereby affected.

It is also possible to fit a flange 134 at the end of the extension 13 (FIG. 4) with which a flange 26 arranged loosely on the sleeve 25 cooperates for fixing the sleeve 25 onto the valve body. In this case the flange 26 includes holes 260 drilled for receiving screws 22. The sleeve 25 has a shoulder 251 at the end 250 next adjacent the valve body 1 which bears against the flange 26 outside the extension 13 and facing away from the extension 13. After adjustment of the valve plate 5 has been performed, the sleeve 25 can, in any position of rotation of the sleeve 25 with respect to the flange 26, be connected by means of screws 22 to the extension 13. Hence the flange 26 forms a clamping part for the sleeve 25.

Figure 4:
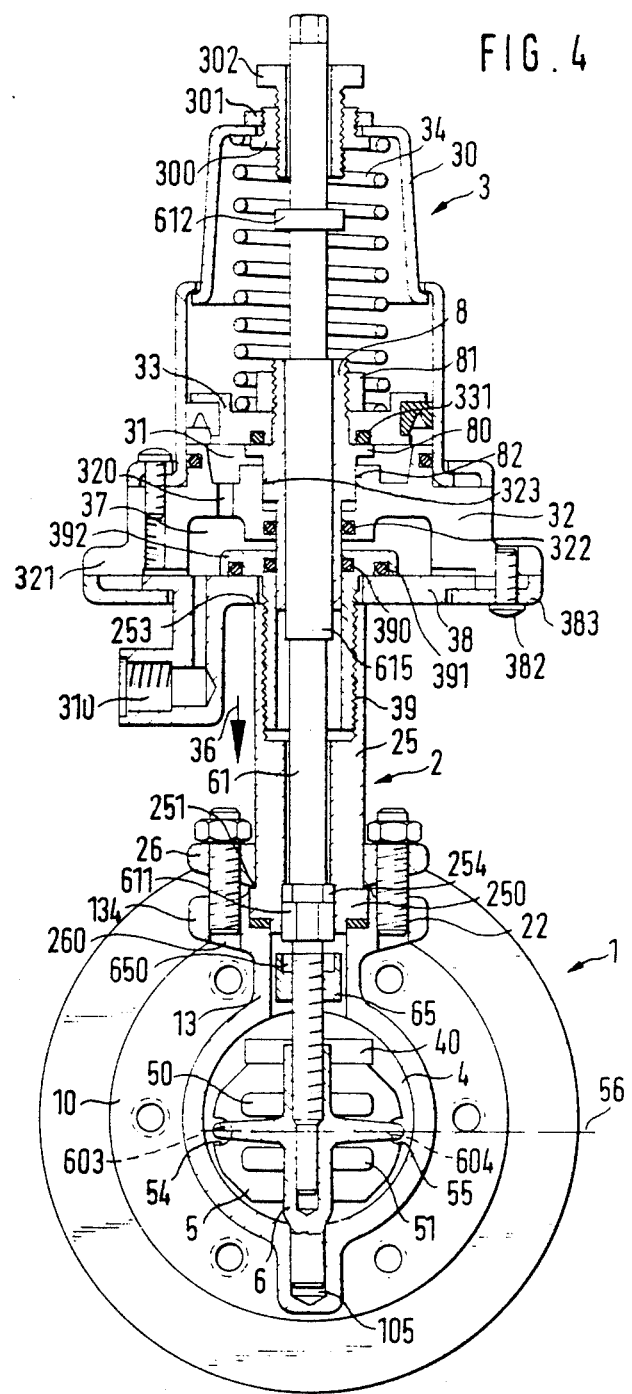
FIG. 4 is a longitudinal section of an alternate embodiment of a slide valve in accordance with the invention, having an inlet opening for the control medium which can be rotated relative to the driving unit.

The securing of the positioning-sleeve 6 against rotation may also be done in different ways. Instead of the guide pin 601 and the longitudinal groove 106 in the bore 105 the carrier or dog 60 on the positioning-sleeve 6 may be made fork-shaped (FIG. 4). The two carrier prongs 603 and 604 engage in recesses 54, 55 lying diametrically opposite one another at the circumference of the valve plate 5. In these recesses 54 and 55 engage the two carrier prongs 603 and 604 which are carried by the common carrier 60. If the positioning-rod 61 is turned for the adjustment of the valve plate 5 one carrier prong 603 or 604 engages counterpart 4 and hence gets prevented from further turning.

The foregoing description shows that optimum operation can only be achieved if the relative positions between the valve plate 5 and the counterpart 4 may be exactly adjusted and maintained during working. By simple means the carrier prongs 603 and 604 bring about a centering of the valve plate 5 through their symmetrical engagement in the valve plate, the carrier 60 swinging automatically into the correct position on the positioning-rod 61. At the same time the position of the carrier prongs 603 and 604 is established by the guidance of the carrier 60 on the positioning-rod 61 which prevents a skew position of the valve plate 5 with respect to the direction of the stroke. In this way jamming of the valve plate is reliably prevented and also no tensions arise on the valve plate 5.

Since the valve plate 5 includes one solid more than passages 50 and 51 and hence can cover one more passage than it has itself, the counterpart 4 may include one passage more than the valve plate 5. In order to achieve as straight a flow as possible of the medium through the valve plate 5 and the counterpart 4, in accordance with the embodiments of the object of the invention as shown, the valve plate 5 exhibits an even number of passages 50 and 51 which are arranged symmetrically about the central plane 56.

The nominal cross-sectional area is therefore divided up in the counterpart 4 over an odd number of passages 400, 410, 401, 411 and 402, 412, whereby the size of the even number, smaller by one passage, of passages 50 and 51 in the valve plate 5 then follows automatically.

Through the adjustment of the valve plate 5 the driving unit 3 alters its relative position of rotation with respect to the body 1. In order to bring the driving unit 3 with its opening 310 in the desired or needed position of rotation, the driving unit 3 in accordance with FIG. 7 is fastened rotatably onto the connecting part 2 made as the sleeve 25. This may in principle be effected in various ways.

In FIG. 7, an embodiment of the invention is shown by way of example, in which the direction of action of the driving unit 3 as compared with the embodiments shown in FIG. 1 to 3 is reversed. For this purpose, counter part 4 may be inverted 180 degrees in its position as described on pages 24 and 25 previously. The control medium in this embodiment does not cooperate with the piston but with a diaphragm 332 which is clamped between the cylinder bottom 32 and the cylinder 30 and which is connected to the positioning-rod 61 by diaphragm disks 333 and 334. The sleeve 25 forms a shoulder 253 at the end of it next to the driving unit 3 against which the cylinder 30 is forced by the stop 35 screwed into the sleeve 25. Stop 35 extends through a central hole drilled in the cylinder 30 and projects partially beyond it in a flange-like widening 352. Seals 350 and 351 are provided to elastically clamp and seal cylinder 30 and stop 35. Stop 35 is tightened so that the seals 350 and 351 seal satisfactorily but allows the cylinder 30 and hence the driving unit 3 connected to it to be able to be rotated with respect to the stop 35. The positioning rod 61 of FIG. 7, which forms part of the screw connection between the driving unit 3 and the valve plate 5, is fixed to the housing 30 for rotation by means of spring 34 and discs 333 and 334. Rotation of the driving unit housing 30 will cause rotation of the position rod 61 through these elements.

Adjustment of the valve plate setting can be had by rotation of the driving unit 3 and connecting part 2 together relative to the valve body 1 without holding bushing 353 stationary so that it too rotates with driving unit 3 and connecting part 2. For this purpose, connecting part 2 may be connected to valve body 1 in a manner such as shown in FIGS. 3 and 4 so that the connection between connecting part 2 and valve body 1 may be loosened for relative rotation therebetween. In this case, threads 610 move in or out of threaded sleeve 6, depending on direction of rotation, to adjust the vertical position of valve plate 5 and openings in counterpart 4. Since sleeve 6 is fixed against rotation and screw-rod 61 rotates together with bush 353, driving unit 3, and connecting part 2, sleeve 6, and hence valve plate 5, travels up and down on threads 610 for adjustment.

Upon rotating the driving unit 3 in order to bring valve plate 5 into the desired position, the positioning-rod 61 is no longer to be rotated. Depending upon the construction of the device in accordance with the invention the self-locking of the positioning-rod 61 is already assured so that special measures are not necessary. For example, in the case of a construction as in FIG. 1 (see the seals 130) this as a rule is the case.

In other embodiments of the invention relative turning between the positioning-rod 61 and the connecting part 2, such as sleeve 25, is made impossible. For this purpose a device is associated with positioning-rod 61 for securing against rotation with respect to sleeve 25 is shown in FIG. 4. End 250 of the sleeve 25 includes an internal polygonal guide 254 in which the positioning-rod 61 is guided by means of an external polygonal guide 611 carried thereon. In order to be able to set the travel of the valve plate 5 in this case, the nut 65 exhibits on the side of it next the polygonal guide 611 a cylindrical recess 650 which is made correspondingly large. As a polygonal guide triangular, square, hexagonal or the like profile may be applied.

Naturally it is possible to provide a guide of that kind at the other end of the sleeve 25 instead.

It is not necessary that the whole driving unit 3 is arranged to be rotatable on the connecting part 2. In accordance with FIG. 3 the cylinder bottom 32 is provided with drilled holes 320 by means of which the pressure chamber 31 is connected to a second chamber 37 instead of being connected directly to opening 310. Chamber 37 is closed off by carrier plate 38 and is connected via an opening 310 to the control pipe (not shown). The carrier plate 38 is sealed with respect to the sleeve 25 by means of a seal 380 and with respect to the cylinder bottom 32 by means of a seal 381. Clamp ring 383 and screws 382 connect and clamp the plate 38 and cylinder bottom 32 which extends outwards radially in the form of a flange 321. Hence after loosening the clamping action by loosening the screws, the carrier plate 38 and opening 310 may be rotated with respect to the driving unit 3.

In the case of slide valves of the aforesaid kind, it is of particular importance for satisfactory operation that the travel be limited in both directions by means of stops which do not cooperate with the valve plate 5, in order that this ceramic part is not subjected to any tensions. The one limitation of the stroke is provided in the embodiments shown by the piston 33 and the stop 35. The other limitation of the stroke is achieved, in the embodiment of FIG. 1, by two locknuts 62 and 63 screwed onto the positioning-rod 61. These locknuts 62 and 63 are arranged to be completely exposed and therefore can easily be set, yet this requires an elaborate connecting part 2. In the embodiments shown in FIGS. 3 and 4 a simple connecting part 2 made as the sleeve 25 may be applied, yet in this case setting of the travel is possible only with the device taken apart.

But other constructions of these stops are possible. One such other execution which exhibits both the advantage of the simple connector part and also the advantage of good accessibility and thereby simple adjustability of the stop, is explained in connection with FIG. 4.

In the end of the cylinder 30 of the driving unit 3, remote from the valve body 1, a stop 302 is supported to be adjustable by means of a threaded bush 300 which is fastened by means of a locknut 301 in the cylinder 30. A stop ring 612 is arranged on the positioning-rod 61. The stop ring 612 may be an integral component of the positioning-rod 61 or else be arranged to be adjustable on the positioning-rod 61 for coarse adjusting of the limitation of the stroke. The fine setting of the limitation of the stroke is effected then by means of the stop 302. Since this stop 302 is accessible from outside the driving unit 3 or the connecting part 2, the travel may be fixed at any time without difficulty.

Hence by the stop 35 or stop 302 the travel of the valve plate 5 is fixed, while the position of the range of stroke is set by the screw connection which alters the distance apart (the thread 610 in the embodiments shown hitherto).

A similar compact limitation of the travel is shown in FIG. 6. In the case of this embodiment the positioning rod 61 includes a shoulder 614 with which is connected a section 613 of the positioning-rod 61 having a reduced diameter and which is made either as an intermediate section or else retains this reduced diameter. In the sleeve 25 of connecting part 2 a recess 255 is provided through which a stop 67 extends. A counterpart 670 in the style of a clamp is carried by the sleeve 25 in such a way that the section 613 of the positioning-rod 61 which is reduced in diameter is not affected by the stop 67. But upon contact of the shoulder 614 against the stop 67 further movement of the positioning-rod 61 is prohibited in the direction towards the driving unit 3.

In the case of the embodiment shown in FIG. 7 a threaded bush 353 is screwed into the cylinder bottom 32. A side of the bush next to the driving unit 3 serves as a stop for the diaphragm disk 334 and the diaphragm 332. A side of bush 353 remote from the driving unit 3 serves as a stop for two locknuts 62 and 63 which are screwed onto the end of the positioning-rod 61 remote from the valve body 1. The threaded bush 353 includes at its outer end a polygonal profile 354 for turning. In accordance with the invention the thread 355 includes the same pitch as the thread on the screw connection to alter the distance apart (the thread 610 in the embodiments shown hitherto).

The distance of the locknut 62 from the end face of the threaded bush 353 is preset with the diaphragm disk 334 resting against the other end of the threaded bush 353.

To adjust the position of the fluid inlet port 310 in FIG. 7, connecting part 2 and driving unit 3 may be rotated together. As described previously, connecting part 2 may be connected to valve body 1 in a manner such that this connection may be loosened for relative rotation between connecting part 2 and valve body 1. In this case, threaded bush 353 is held stationary by any suitable tool such as a pair of pliers. Driving unit 3 and connecting part 2, loosened with respect to valve body 1, are both rotated together relative to valve body 1 and bush 353. The setting of the valve plate 5 position remains unchanged since the pitch of threads 610 and 355 are the same while fluid inlet port 310 is turned to any desired position. For example, as the bushing backs out of housing 32 upon rotation of unit 3 and part 2, the threads 610 back out of the sleeve a corresponding amount so that the position of sleeve 6 and alignment of valve plate 5 do not change.

This setting of the stroke can be effected in the case of the device in accordance with FIG. 3 by screwing stop 35 into the cylinder bottom 32, if the stop 35 and the thread 610 have the same pitch.

In principle the screw connection which alters the distance may be provided at any point in the part which transfers the stroke of the driving unit 3 to the valve plate 5. In the case of the embodiments described hitherto with the aid of FIGS. 1, 3 and 4 this point is between the positioning-rod 61 and the positoning-sleeve 6.

FIG. 4 shows an embodiment in which the screw connection is provided between a carrier 8 and the positioning-rod 61. The carrier 8 includes a flange 80 which rests against a seal 331 provided in the piston 33. The piston 33 by means of a nut 81 is screwed onto the carrier 8. The carrier 8 is screwed onto a threaded portion 615 of the positioning-rod 61 and extends through the cylinder bottom 32, Both the carrier 8 and the cylinder bottom 32 have cooperating polygonal profiles 323 and 82 in order to prevent relative turning between the driving unit 3 and the carrier 8. Adjacent the polygonal profiles 323 and 82, a sealing ring 322 is provided in an annular bore in the cylinder bottom 32 which encircles the outer circumference of the carrier 8.

Instead of the stop 35 in FIG. 1, a bush 39 is screwed into the sleeve 25 into which the end of the carrier 8 projects. A seal 390 for sealing the bush 39 is provided. Carrier plate 38 is elastically clamped between a flange-like widening 392 of the bush 39 and a shoulder 253 on the connecting part 2. A further sealing ring 391 makes a seal therebetween.

An internal polygonal guide 254 is provided in valve body 1 for guiding the positioning-rod 61. A corresponding external polygonal guide 611 on the positioning-rod 61 fixes the rod against rotation.

After loosening the screws 382 the drive housing which is formed by the cylinder bottom 32 and the cylinder 30 may be rotated with respect to the carrier plate 38 and the valve body 1. In doing so the cylinder bottom 32 takes along with it the carrier 8 which shifts the positioning-rod 61, which is prevented from turning, in the direction towards or away from the valve body 1, depending upon the direction of rotation. When the desired setting has been reached, the carrier plate 38 can still be rotated to properly position the opening 310 for the supply of medium, before the drive housing 30, 32 is fixed with respect to the carrier plate 38 by tightening the screws 382.

If the part to be acted upon in the driving unit 3 is an electromagnet, the embodiment shown in FIG. 4 may be modified wherein the electromagnet is adjustable relative to the valve body 1 by the carrier 8 to which the electromagnet is fastened in a suitable manner. By this means too, by rotating the drive housing 30, 32 with respect to the positioning-rod 61 the distance between the electromagnet and the valve plate 5 may be altered.

Further modifications of the valve within the scope of the invention are possible by exchange of parts with one another or by their replacement by equivalents or by any combination of the means shown.

What is claimed is:

1. A slide valve device having a valve body and a valve plate which can slide transversely to the direction of flow of the medium and includes passages running transversely to the direction of slide, said valve plate cooperating with a counterpart which includes passages transversely to the direction of the movement of the slidable valve plate which can be opened or closed by the valve plate, wherein said device comprises:

said valve plate consists of ceramic and is carried in said valve body on an in-flow side of said valve body;

said counterpart including a valve seat which consists of ceramic and is carried on an out-flow side of said valve plate; and a metallic supporting part which is carried next adjacent said valve seat which supports the valve seat across the whole area of the side of said valve seat opposite from the valve plate and supports the valve seat against the direction of flow of the medium through the valve;

said metallic supporting part being fixed in said valve body against movement in the direction of fluid flow to rigidly support said valve seat; and said passages in the counterpart being formed by passages in said valve seat and passages in said support part which correspond in alignment with said passages in said valve seat.

2. A slide valve device as in claim 1 wherein the supporting part is replaceable.

3. A slide valve device as in claim 2 wherein the supporting part is an integral component of the valve body.

4. A slide valve device as in claim 1 including means carried by said supporting part favorable to flow.

5. A slide valve device as in claim 4, characterized in that said means includes ribs carried by said supporting part which run in parallel with the passages and taper in the direction of flow of the medium.

6. A slide valve device as in claim 1 including means carried adjacent said valve plate inducing favorable flow therethrough.

7. A slide valve device as in claim 1 including making said valve body favorable to flow on the side next the medium inlet.

8. A slide valve device as in claim 1 including:
a drive unit; and
drive connection connected between said drive unit and said valve plate being outside the flow of the medium which is to be controlled.

9. A slide valve device as in claim 1, wherein the dimension of the passages in said valve seat in the direction of the movement of the valve plate is smaller than said dimension of the passages of the supporting part.

10. A slide valve device as in claim 1, wherein said valve seat rests against said support, and including elastic means securing said valve seat axially and radially to float said valve seat elastically in said valve body.

11. A slide valve device as in claim 8 wherein said valve plate includes two circumferential recesses lying opposite one another and a carrier prong engaging each recess connected to said drive connection.

12. A slide valve device as in claim 1 wherein said valve plate and said supporting part include an even number of passages, which are arranged symmetrically about a central plane of said valve plate.

13. A valve having a valve body and a valve plate which can be moved transversely to the direction of flow through a flow passage which is to be controlled, a driving unit for moving said valve plate having a part acted upon by a control medium, a positioning-rod connecting said valve plate to said driving unit said driving unit being rotatable with respect to said valve body, means fixing said driving unit in any position of rotation, said part of said driving unit acted upon by the control medium and said valve plate being connected together by a screw connection carried by said positioning rod which alters the distance between said driving unit and valve plate, said screw connection being fixably connected to said driving unit for rotation with said driving unit, and said screw connection including a part connected to said valve body which is fixed against rotation relative to said valve body so that rotation of said driving unit causes adjustment in the positioning of said valve plate in said valve body.

14. A valve as in claim 13 including a connecting part connecting said driving unit and valve body wherein said driving unit is fastened rotatably to the connecting part, said connecting part being rotatable relative to said valve body.

15. A valve as in claim 14 including a carrier plate operatively associated with said driving unit which carries a drive housing, said drive housing being loosely connected to said carrier plate so as to be rotated with respect to the carrier plate, said drive housing including a part which can be acted upon by the control medium.

16. A valve as in claim 15, wherein said drive housing part acted upon by said control medium includes a piston carried in a pressure chamber, a second chamber provided between said drive housing and said carrier plate having an inlet opening for the control medium, and said pressure chamber being connected by at least one opening to said second chamber.

17. A valve as in claim 15, wherein said carrier plate is carried by said connecting part so as to be rotatable but axially fixed.

18. A valve as in claim 14 including a stop carried by said connecting part at the end of it adjacent said driving unit, at the end of it next the driving unit said stop having a widened flange, a carrier plate upon which said driving unit is carried, said carrier plate being elastically clamped between said flange and said connecting part end by means of seals.

19. A valve as in claim 13 wherein part of the screw connection carried fixed against rotation in said driving unit carries said part acted upon by said control medium and is screwed onto the positioning-rod.

20. A valve as in claim 13 wherein said positioning-rod is connected fixedly in rotation to said driving unit.

21. A valve as in claim 20 wherein said connecting part is connected fixedly in rotation to said driving unit.

22. A valve as in claim 21 including means carried by said positioning-rod for securing said rod against rotation relative to said connecting part.

23. A valve as in claim 22 wherein said connecting part includes an internal polygonal guide in which said positioning-rod is guided by means of correspondingly shaped guide carried thereon.

24. A valve as in claim 13 wherein said screw connection includes a positioning-sleeve screwed onto said positioning-rod.

25. A valve as in claim 24 wherein said valve plate slides by means of a carrier which is adjustably connected to said positioning-rod, said valve body including slots running transversely to the direction of its movement, a stationary counterpart including slots which can be opened or closed by the valve plate, said carrier which adjusts said valve plate being carried by said positioning-sleeve.

26. A valve as in claim 25 wherein said valve plate consists of ceramic and is carried on the in-flow side of said valve body, said counterpart includes a valve seat which consists of ceramic carried on the out-flow side of said valve seat, a metallic supporting part supporting said valve seat across the whole area of a side of said valve seat remote from said valve plate, said slots in said counterpart being formed by slots in said valve seat and slots in said supporting part corresponding in alignment with said slots in said valve seat.

27. A valve as in claim 25 wherein said positioning-sleeve includes a blind bore in which said positioning-rod terminates, and said positioning-sleeve is received in a bore formed in the valve body.

28. A valve as in claim 25 including means for securing said positioning-sleeve which includes a fork-shaped carrier which carries said valve plate.

29. A valve as in claim 25 wherein said valve plate and supporting part includes an even number of said slots arranged symmetrically about a central plane which is perpendicular to said positioning sleeve.

30. A valve as in claim 13 wherein said connecting part is made as a sleeve which contains said positioning-rod and includes a cylindrical end which is supported rotatably in a bore formed in said valve body.

31. A valve as in claim 30 wherein said sleeve includes an annular shoulder, and a clamping part which can be connected to said valve body against said shoulder.

32. A valve as in claim 13 including a stop associated with said positioning-rod which limits the movement of said rod brought about by said driving unit.

33. A valve as in claim 32 wherein said stop includes a recess which contains an external polygonal guide carried by said positioning-rod.

34. A valve as in claim 32 wherein said positioning-rod includes a stop fixed thereon, a counterstop carried by said driving unit is arranged to be adjustable and accessible from outside said device.

35. A valve as in claim 32 wherein said stop is arranged to be adjustable on said positioning-rod from outside said driving unit and cooperates with said driving unit which acts as a counterstop.

36. A valve as in claim 35 including a housing for said driving unit, a threaded bush carried by said housing which serves on one side as a stop for said part which is acted upon by said control medium and on another side as a counterstop for said stop arranged on said positioning-rod.

37. A valve as in claim 36 wherein said threaded bush is screwed into said housing of said driving unit and includes threads having the same pitch as said screw connection between said driving unit and valve plate.

* * * * *